United States Patent
Horstman et al.

(10) Patent No.: US 8,399,594 B2
(45) Date of Patent: Mar. 19, 2013

(54) BLOCKED-ISOCYANATE SILICONE RESINS

(75) Inventors: John Bernard Horstman, Midland, MI (US); Randall Schmidt, Midland, MI (US); Gary Wieber, Midland, MI (US); Gerald Lawrence Witucki, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 446 days.

(21) Appl. No.: 12/520,144

(22) PCT Filed: Dec. 4, 2007

(86) PCT No.: PCT/US2007/024919
§ 371 (c)(1),
(2), (4) Date: Jun. 19, 2009

(87) PCT Pub. No.: WO2008/088492
PCT Pub. Date: Jul. 24, 2008

(65) Prior Publication Data
US 2010/0093902 A1   Apr. 15, 2010

Related U.S. Application Data

(60) Provisional application No. 60/875,949, filed on Dec. 20, 2006.

(51) Int. Cl.
*C08G 77/26* (2006.01)

(52) U.S. Cl. .......................... 528/38; 525/474
(58) Field of Classification Search ............. 528/38; 525/474

See application file for complete search history.

(56) References Cited

U.S. PATENT DOCUMENTS

| 6,593,417 | B1 * | 7/2003 | Anderson et al. ............. 524/588 |
| 7,423,095 | B2 | 9/2008 | Gordon et al. |
| 7,452,956 | B2 | 11/2008 | Cheng et al. |
| 7,501,473 | B2 | 3/2009 | Gordon et al. |
| 2006/0235142 | A1 | 10/2006 | Hostman et al. |

FOREIGN PATENT DOCUMENTS

WO    WO2005037887    4/2005

OTHER PUBLICATIONS

Steffen Maier, et al.: Macromolecules, Isocyanate-Free Route to Caprolactam-Blocked Oligomeric Isocyanates via Carbonylbiscaprolactam—(CBC-) Mediated End Group Conversion, vol. 36, Jul. 6, 2003, pp. 4727-4734.

* cited by examiner

*Primary Examiner* — Kuo-Liang Peng
(74) *Attorney, Agent, or Firm* — Alan Zombeck

(57) ABSTRACT

This invention relates to new blocked isocyanate silicone resins which can be used to make shelf stable one part curable coating compositions. These coatings do not cure until heated. The coatings provide weather resistant protection for numerous substrates including automobile exteriors, leather fabric, electronic components, wood floors and surfaces.

10 Claims, No Drawings

BLOCKED-ISOCYANATE SILICONE RESINS

CROSS-REFERENCE TO RELATED APPLICATIONS

This application is a U.S. national stage filing under 35 U.S.C. §371 of PCT Application No. PCT/US07/24919 filed on 04/DEC/2007, currently pending, which claims the benefit of U.S. Provisional Patent Application No. 60/875,949 filed 20/DEC/2006 under 35 U.S.C. §119 (e). PCT Application No. PCT/US07/24919 and U.S. Provisional Patent Application No. 60/875,949 are hereby incorporated by reference.

DESCRIPTION

This invention relates to new blocked isocyanate silicone resins which can be used to make shelf stable one part curable coating compositions. These coatings do not cure until heated. The coatings provide weather resistant protection for numerous substrates including automobile exteriors, leather fabric, electronic components, wood floors and surfaces. Since isocyanates are reactive with moisture and have toxicity issues it would be useful to make a material which does not form an isocyanate until it is in place and ready to be cured. Further, applications such as automotive top coats, and electronics packaging prefer a one-part delivery. Also, any protective coating application where the material is applied in a manufacturing setting such as leather fabric protective coatings which can readily expose the substrate to an oven will value the utility of a heat activated one-part formulation of the invention.

The present invention is a blocked isocyanate silicone resin having an average formula (I) $R^1{}_a(R^2O)_b SiO_{(4-(a+b)/2)}$, where each $R^1$ is monovalent and independently selected from an alkyl group, an aryl group, and a blocked isocyanate group having a general formula (II) —NHC(O)Z, where Z is a blocking agent such that at elevated temperatures it will dissociate and produce the corresponding isocyanate, which $R^1$ groups may be the same or different, $R^2$ is hydrogen or a monovalent C1 to C4 alkyl group, a is from 0.7 to 2.2, b is from 0 to 0.5, and (a+b) is 0.7 to 2.3, with the proviso that on average there is at least one blocked isocyanate group per silicone resin molecule.

The alkyl groups of $R^1$ are illustrated by methyl, ethyl, propyl, butyl, hexyl, octyl, decyl, dodecyl, hexadecyl, and octadecyl. Alternatively, the alkyl group comprises 1 to 8 carbon atoms. Alternatively, the alkyl group is methyl.

The aryl groups of $R^1$ are illustrated by phenyl, naphthyl, benzyl, tolyl, xylyl, methylphenyl, 2-phenylethyl, 2-phenyl-2-methylethyl, chlorophenyl, bromophenyl and fluorophenyl. Alternatively, the aryl group comprises 6 to 8 carbon atoms. Alternatively the aryl group is phenyl.

Up to 50 mole percent of $R^1$ groups may be silicon-bonded aryl groups. Alternatively, 10 to 30 mole percent of $R^1$ groups are silicon-bonded aryl groups. Alternatively 20 to 30 mole percent of $R^1$ groups are silicon-bonded aryl groups.

As used herein, the term "blocked isocyanate" refers to a group that converts to an isocyanate upon heating with blocking agents chosen from phenols, pyridinols, thiophenols, methylethylketoxime, amides, caprolactam, imidazoles and pyrazoles. As described in Macromolecules 36 (13) 4727 2003, the formation of a blocked isocyanate is traditionally carried out by reacting an isocyanate containing material with a blocking agent typically illustrated as:

R'NCO+HZ→R'NHCOZ where HZ is a blocking agent such as a phenol listed above and R' is the base molecule that the blocked isocyanate is bonded to.

Alternatively, the blocked isocyanate can be formed from amine functional materials through reaction with carbonyl-biscaprolactam (CBC):

R'NH$_2$+CBC→R'NHC(O)Caprolactam

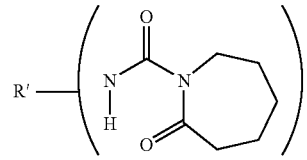

This reaction is important because an isocyanate is only formed upon curing. This helps with handling since the isocyanate has toxicity issues.

In the present invention, subscript a has a value from 0.7 to 2.2, alternatively 0.7 to 2.0, alternatively 1.0 to 1.6, subscript b has a value from 0 to 0.5, alternatively 0 to 0.2, and subscripts (a+b) have a value from 0.7 to 2.3, alternatively 0.7 to 2.0, alternatively 0.7 to 1.9.

The blocked isocyanate silicone resin must have at least one blocked isocyanate group per silicone resin molecule. When used in compositions, the blocked isocyanate equivalent weight can be 150 to 1500, alternatively 300 to 1000. As used herein "equivalent weight" means the weight of material that contains one mol of desired groups, for example here, the blocked isocyanate group.

The blocked isocyanate silicone resin may be prepared by (1) forming a mixture comprising (A') An aminofunctional silicone resin having the average formula (III) $R^3{}_a(R^2O)_b SiO_{(4-(a+b)/2)}$, where each $R^3$ is monovalent and independently selected from an alkyl group, an aryl group, and an aminofunctional hydrocarbon group which $R^3$ groups may be the same or different, $R^2$, a, b, and a+b are as defined above, with the proviso that there is on average at least one primary amino containing hydrocarbon group per aminofunctional silicone resin molecule; and (B') a carbonylbiscaprolactam, wherein the carbonylbiscaprolactam is added at up to a 10% molar excess relative to the moles of primary amino groups present in the aminofunctional silicone resin (A'); and (2) heating the mixture at a temperature until the blocked isocyanate silicone resin is formed.

The alkyl and aryl groups of $R^3$ are illustrated by the same groups described above for $R^1$.

The amino containing hydrocarbon group is illustrated by groups having the formula —$R^4NHR^5$ or —$R^4NHR^4NHR^5$ wherein each $R^4$ is independently a divalent hydrocarbon radical having at least 2 carbon atoms and $R^5$ is hydrogen or an alkyl group. Each $R^4$ is typically an alkylene radical having from 2 to 20 carbon atoms. $R^4$ is illustrated by —CH$_2$CH$_2$—, —CH$_2$CH$_2$CH$_2$—, —CH$_2$CHCH$_3$—, —CH$_2$CH$_2$CH$_2$CH$_2$—, —CH$_2$CH(CH$_3$)CH$_2$—, —CH$_2$CH$_2$CH$_2$CH$_2$CH$_2$—, —CH$_2$CH$_2$CH$_2$CH$_2$CH$_2$CH$_2$—, —CH$_2$CH$_2$CH(CH$_2$CH$_3$)CH$_2$CH$_2$CH$_2$—, —CH$_2$CH$_2$CH$_2$CH$_2$CH$_2$CH$_2$CH$_2$CH$_2$—, and —CH$_2$CH$_2$CH$_2$CH$_2$CH$_2$CH$_2$CH$_2$CH$_2$CH$_2$—. The alkyl groups $R^5$ are as illustrated above for $R^1$ Alternatively, the primary amino containing hydrocarbon groups include —CH$_2$CH$_2$NH$_2$, —CH$_2$CH$_2$CH$_2$NH$_2$, —CH$_2$CH$_2$CH$_2$CH$_2$NH$_2$, —CH$_2$CH$_2$CH$_2$CH$_2$CH$_2$NH$_2$, —CH$_2$CH$_2$CH$_2$CH$_2$CH$_2$CH$_2$NH$_2$, —CH$_2$CH$_2$NHCH$_2$CH$_2$NH$_2$, —CH$_2$CH$_2$CH$_2$NHCH$_2$CH$_2$CH$_2$NH$_2$, and —CH$_2$CH$_2$CH$_2$NHCH$_2$CH$_2$CH$_2$NH$_2$, Aminofunctional silicone resins useful in the present invention may be prepared by methods described in the art, in particular U.S. Patent Application No. 60/487,698, WO2005/010076 and U.S. Publication No. 20060205868 which are herein incorporated by reference. Generally, the aminofunctional silicone resins useful in this invention can be prepared by hydrolytic polycondensation of alkoxysilanes by one of two methods. For example, the hydrolysis of the non-aminofunctional alkoxysilanes can be accomplished via catalysis with strong acid, followed by addition of the aminofunctional silanes and base-catalyzed equilibration of these species to yield the aminofunctional silicone resin. In other cases, the entire hydrolysis can be run under base-catalyzed conditions with the aminofunctional alkoxysilane(s) present from the start. In both cases, the hydrolysis would be followed by distillative removal of by-product alcohol, filtration and removal of solvent to provide the product.

The aminofunctional silicone resin is mixed at up to a 10% molar excess relative to the moles of primary amino hydrocarbon groups, alternatively in a stoichiometric ratio (1:1 molar ratio) with a carbonylbiscaprolactam (CBC, Allinco, The Netherlands) compound to form a mixture. Generally, the molar ratio of blocked isocyanate groups to primary amino groups added is 0.9:1 to 1.2:1, alternatively 1:1 to 1:1. The mixture is then heated until the blocked isocyanate silicone resin is formed. Alternatively, the mixture is heated at 50° to 150° C. until the blocked isocyanate silicone resin is formed. Alternatively, the mixture is heated at 100° C. for 0.3 to 3 hours. The byproduct caprolactam can be removed by vacuum stripping further driving the reaction to completion.

One may also make a blocked isocyanate silicone resin by starting with an isocyanate functional silicone resin and converting it to a blocked isocyanate by reacting it with a blocking agent described earlier. The isocyanate functional silicone resin can be made by reacting an aminofunctional silicone resin with diphosgene.

Another embodiment of the present invention is a curable coating composition comprising (A) a blocked isocyanate silicone resin containing on average at least two blocked isocyanate groups per molecule; and (B) a functional silicone material, a functional organic material or a mixture thereof having in each case on average at least 2 carbon-bonded hydroxyl groups or aminofunctional hydrocarbon groups where the functional organic material is chosen from an organic polyol and an organic amine and the functional silicone material has an average formula $R^6_n(R^2O)_m SiO_{(4-(n+m)/2)}$ where each $R^6$ is monovalent and independently selected from a hydrogen atom, an alkyl group, an aryl group, a carbinol group free of aryl groups having at least 3 carbon atoms, an aryl-containing carbinol group having at least 6 carbon atoms, or an aminofunctional hydrocarbon group, which $R^6$ groups may be the same or different, $R^2$ is hydrogen or a monovalent C1 to C4 alkyl group, n is from 0.7 to 2.2, m is from 0 to 0.5, and m+n is 0.7 to 2.3, where the total mole ratio of blocked isocyanate groups to carbon-bonded hydroxyl+amino groups is 0.9:1 to 1.3:1, with the proviso when the functional silicone material is used there is on average at least 1 carbinol group or aminofunctional hydrocarbon group per molecule.

Another embodiment of the invention relates to a method of making a curable coating composition comprising
(1) forming a mixture comprising
(A) a blocked isocyanate silicone resin containing at least two blocked isocyanate groups per molecule, and
(B) a functional silicone material, a functional organic material or a mixture thereof having in each case on average at least 2 carbon-bonded hydroxyl groups or aminofunctional hydrocarbon groups where the functional organic material is chosen from an organic polyol and an organic amine and the functional silicone material has an average formula $R^6_n(R^2O)_m SiO_{(4-(n+m)/2)}$ where each $R^6$ is monovalent and independently selected from a hydrogen atom, an alkyl group, an aryl group, a carbinol group free of aryl groups having at least 3 carbon atoms, an aryl-containing carbinol group having at least 6 carbon atoms, or an aminofunctional hydrocarbon group, which $R^6$ groups may be the same or different, $R^2$ is hydrogen or a monovalent C1 to C4 alkyl group, n is from 0.7 to 2.2, m is from 0 to 0.5, and m+n is 0.7 to 2.3, where the total mole ratio of blocked isocyanate groups to carbon-bonded hydroxyl+amino groups is 0.9:1 to 1.3:1, with the proviso when the functional silicone material is used there is on average at least 1 carbinol group or aminofunctional hydrocarbon group per molecule.

Another embodiment of the invention relates to a method of making cured coating composition comprising
(1) forming a mixture comprising
(A) a blocked isocyanate silicone resin containing at least two blocked isocyanate groups per molecule, and
(B) a functional silicone material, a functional organic material or a mixture thereof having in each case on average at least 2 carbon-bonded hydroxyl groups or aminofunctional hydrocarbon groups where the functional organic material is chosen from an organic polyol and an organic amine and the functional silicone material has an average formula $R^6_n(R^2O)_m SiO_{(4-(n+m)/2)}$ where each $R^6$ is monovalent and independently selected from a hydrogen atom, an alkyl group, an aryl group, a carbinol group free of aryl groups having at least 3 carbon atoms, an aryl-containing carbinol group having at least 6 carbon atoms, or an aminofunctional hydrocarbon group, which $R^6$ groups may be the same or different, $R^2$ is hydrogen or a monovalent C1 to C4 alkyl group, n is from 0.7 to 2.2, m is from 0 to 0.5, and m+n is 0.7 to 2.3, where the total mole ratio of blocked isocyanate groups to carbon-bonded hydroxyl+amino groups is 0.9:1 to 1.3:1, with the proviso when the functional silicone material is used there is on average at least 1 carbinol group or aminofunctional hydrocarbon group per molecule,
(2) Heating the mixture so that the blocked isocyanate dissociates to the corresponding isocyanate which enables the curing reactions to proceed.

Another embodiment of the invention relates to a cured coating composition prepared by the method described above.

The blocked isocyanate silicone resin containing on average at least two blocked isocyanate groups per molecule (A) is as described above. The equivalent weight of the blocked isocyanate silicone resin may be 150 to 1500, alternatively 300 to 1000.

With respect to the silicone functional material of Component (B), the alkyl and aryl groups are as described above for $R^1$. Subscript n is from 0.7 to 2.2, alternatively 1.0 to 2, subscript m is 0 to 0.5, alternatively 0 to 0.2, and subscripts m+n is 0.7 to 2.3, alternatively 1 to 2.

With respect to the silicone functional material, the term "carbinol group" is defined as any group containing at least one carbon-bonded hydroxyl (COH) group. Thus the carbinol groups may contain more than one COH group such as for example

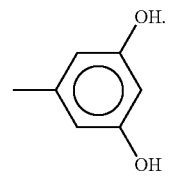

The carbinol group free of aryl groups having at least 3 carbon atoms is illustrated by groups having the formula $R^7OH$ wherein $R^7$ is a divalent hydrocarbon group having at least 3 carbon atoms or a divalent hydrocarbonoxy group having at least 3 carbon atoms. The group $R^7$ is illustrated by alkylene groups selected from —$(CH_2)_x$— where x has a value of 3 to 10, —$CH_2CH(CH_3)$—, —$CH_2CH(CH_3)CH_2$—, —$CH_2CH_2CH(CH_2CH_3)CH_2CH_2CH_2$—, and —$OCH(CH_3)(CH_2)_y$— wherein y has a value of 1 to 10. The carbinol group free of aryl groups having at least 3 carbon atoms is also illustrated by groups having the formula $R^8(OH)$ $CH_2OH$ where $R^8$ is a group having the formula —$CH_2CH_2(CH_2)_y$ $OCH_2CH$— wherein y has a value of 1 to 10.

The aryl-containing carbinol group having at least 6 carbon atoms is illustrated by groups having the formula $R^9OH$ wherein $R^9$ is an arylene group selected from —$(CH_2)_z$ $C_6H_4$—, —$CH_2CH(CH_3)(CH_2)_zC_6H_4$— wherein z has a value of 0 to 10, and —$(CH_2)_yC_6H_4(CH_2)_z$— wherein z and y are as described above. Alternatively, the aryl-containing carbinol groups have from 6 to 14 carbon atoms, alternatively 6 to 10 carbon atoms.

The carbinol-functional silicone materials have on average at least one carbinol-group per molecule. The equivalent weight of carbon-bonded hydroxyl groups on the carbinol-functional silicone material may from 100 to 1000, alternatively 200 to 800.

Silicone functional materials containing a carbinol-functional group useful in the present invention may be prepared by methods described in the art, in particular US20060235142 and WO2005/037887, which are herein incorporated by reference. Generally, the carbinol-functional silicone materials may be prepared by reacting (A') at least one hydrogen-functional silicone material having an average formula $R^{10}_d(R^2O)_eSiO_{(4-(d+e)/2)}$, where each $R^{10}$ is monovalent and independently selected from an alkyl group, an aryl group, and a hydrogen atom which $R^{10}$ groups may be the same or different, $R^2$ is as described above, d is 0.7 to 2.2, e is 0 to 0.5, and d+e is 0.7 to 2.3, with the proviso that there are at least two silicon-bonded hydrogen atoms present in the silicone resin; and (B') at least one alkenyl-terminated alcohol; in the presence of (C') a hydrosilylation catalyst; and optionally (D') at least one solvent.

The aminofunctional hydrocarbon group useful in the silicone functional material is illustrated by groups having the formula —$R^{11}NHR^{12}$ or —$R^{11}NHR^{11}NHR^{12}$ wherein each $R^{11}$ is independently a divalent hydrocarbon radical having at least 2 carbon atoms and $R^{12}$ is hydrogen or an alkyl group. Each $R^{11}$ may be an alkylene radical having from 2 to 20 carbon atoms. $R^{11}$ is illustrated by —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2$—, —$CH_2CH_2CH(CH_2CH_3)CH_2CH_2$—, —$CH_2CH_2CH_2CH_2CH_2CH_2CH_2CH_2$—, and —$CH_2CH_2CH_2CH_2CH_2CH_2CH_2CH_2CH_2CH_2$—. The alkyl groups $R^{12}$ are as illustrated above for $R^1$. When $R^{12}$ is an alkyl group it may be methyl.

Typical aminofunctional hydrocarbon groups are —$CH_2CH_2NH_2$, —$CH_2CH_2CH_2NH_2$, —$CH_2CHCH_3NH$, —$CH_2CH_2CH_2CH_2NH_2$, —$CH_2CH_2CH_2CH_2CH_2NH_2$, —$CH_2CH_2CH_2CH_2CH_2CH_2NH_2$, —$CH_2CH_2NHCH_3$, —$CH_2CH_2CH_2NHCH_3$, —$CH_2(CH_3)CHCH_2NHCH_3$, —$CH_2CH_2CH_2CH_2NHCH_3$, —$CH_2CH_2NHCH_2CH_2NH_2$, —$CH_2CH_2CH_2NHCH_2CH_2NH_2$, —$CH_2CH_2CH_2CH_2$ $NHCH_2CH_2CH_2CH_2NH_2$, —$CH_2CH_2NHCH_2CH_2NHCH_3$, —$CH_2CH_2CH_2NHCH_2CH_2CH_2NHCH_3$, —$CH_2CH_2$ $CH_2NHCH_2CH_2CH_2CH_2NHCH_3$, and —$CH_2CH_2NHCH_2$ $CH_2NHCH_2CH_2CH_2CH_3$ Silicone functional materials containing an aminofunctional hydrocarbon group useful in the present invention may be prepared by methods described above for the aminofunctional silicone resin, which are herein incorporated by reference.

The aminofunctional silicone materials have on average at least one amino group per molecule. The equivalent weight of amine hydrogen groups on the aminofunctional silicone material may be from 80 to 800, alternatively 100 to 500.

The organic polyol (synonymous with organic carbinol) is illustrated by ethylene glycol, 1,2-propylene glycol, 1,3-propylene glycol, 1,4-butylene glycol, 2,3-butylene glycol, 1,6-hexanediol, 1,8-octanediol, neopentyl glycol, cyclohexane dimethanol, 2-methyl-1,3-propanediol, glycerol, 1,2,4-butanetriol, pentaerythritol, mannitol, sorbitol, diethylene glycol, triethylene glycol, tetraethylene glycol, poly(ethyleneoxy)glycols generally, dipropylene glycol, poly(propyleneoxy) glycols generally, dibutylene glycol, poly(butyleneoxy) glycols, and polycaprolactone. Other polyhydroxy materials of higher molecular weight which may be used are the polymerization products of epoxides such as ethylene oxide, propylene oxide, butylene oxide, styrene oxide, and epichlorohydrin. Hydroxyl-containing polyesters, polythioethers, polyacetals, polycarbonates, and polyester amides also may be used alone or in combination with the above polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Typical polyether polyols are illustrated by polyalkylene ether polyols having the formula $HO(RO)_OH$ wherein R is an alkylene group and o is an integer large enough that the polyether polyol has a number average molecular weight of at least 250. These polyalkylene ether polyols are well-known components of polyurethane products and can be prepared by the polymerization of cyclic ethers such as alkylene oxides and glycols, dihydroxyethers, and the like by known methods. A particularly common high molecular weight polyol is polytetramethylene glycol. A commercial polyol is Desmophen® R-221-75 polyol (equivalent weight 515 g/mol carbon-bonded hydroxyl) (Bayer, Pittsburgh, Pa.)

The organic polyol materials have on average at least one carbon-bonded hydroxyl group per molecule. The equivalent weight of carbon-bonded hydroxyl groups on the organic polyol material may be from 80 to 800, alternatively 100 to 600.

The organic amine can be illustrated by primary amines such as cinnamyl amine (3-phenyl-2-propenylamine), 4-phenyl-3-butenylamine, 5-phenyl-4-pentenylamine, 6-phenyl-5-hexenylamine, 7-phenyl-6-peptenylamine, 1-methyl-3-phenyl-2-propenylamine, 2-methyl-4-phenyl-3-butenylamine, and others; secondary amines such as N-methyl cinnamyl amine (N-methyl-(3-phenyl-2-propenyl)-amine), N-ethyl cinnamyl amine (N-ethyl-(3-phenyl-2-propenyl)-amine), N-propyl cinnamyl amine (N-propyl-(3-phenyl-2-propenyl)-amine), N-butyl cinnamyl amine (N-butyl-(3-phenyl-2-propenyl)-amine), N-methyl-(4-phenyl-3-butenyl)-amine, N-ethyl-(4-phenyl-3-butenyl)-amine, N-propyl-(4-phenyl-3-butenyl)-amine, N-butyl-(4-phenyl-3-butenyl)-amine, and others; and tertiary amines such as N,N-dimethyl cinnamyl amine (N,N-dimethyl-(3-phenyl-2-propenyl)-amine), N,N-diethyl cinnamyl amine (N,N-diethyl-(3-phenyl-2-propenyl)-amine), N,N-dipropyl cinnamyl amine (N,N-dipropyl-(3-phenyl-2-propenyl)-amine), N,N-dibutyl cinnamyl amine (N,N-dibutyl-(3-phenyl-2-propenyl)-amine), N,N-dimethyl-(4-phenyl-3-butenyl)-amine, N,N-diethyl-(4-phenyl-3-butenyl)-amine, N,N-dipropyl-(4-phenyl-3-butenyl)-amine, and N,N-dibutyl-(4-phenyl-3-butenyl)-amine.

The organic amine materials have on average at least one amino group per molecule. The equivalent weight of amine-hydrogen groups on the organic amine material may be from 50 to 700, alternatively 100 to 500.

For the present coating composition, the total mole ratio of blocked isocyanate groups to carbon-bonded hydroxyl (including carbon-bonded hydroxyl from both silicone functional carbinol and organic polyol) groups and amino groups (including both aminofunctional silicone material and organic amine) is 0.9:1 to 1.3:1, alternatively 1.0:1 to 1.2:1.

Optionally, one may add a cure rate modifier (Component (C)) to the coating composition. Component (C), the cure rate modifier can be any material that affects the cure time of the coating composition and includes cure accelerators, cure inhibitors, and cure catalysts. Examples include phosphine compounds, such as tributylphosphine, triphenylphosphine, tris(dimethoxyphenyl)phosphine, tris(hydroxypropyl)phosphine and tris(cyanoethyl)phosphine; phosphonium salts, such as tetraphenylphosphonium tetraphenylborate, methyltributylphosphonium tetraphenylborate and methyltricyanoethyl phosphonium tetraphenylborate; imidazoles, such as 2-methyl imidazole, 2-phenyl imidazole, 2-ethyl-4-methyl imidazole, 2-undecyl imidazole, 1-cyanoethyl-2-methyl imidazole, 1,4-dicyano-6-[2-methylimidazolyl-(1)]-ethyl-S-triazine and 2,4-dicyano-6-[2-undecylimidazolyl-(1)]-ethyl-S-triazine; imidazolium salts, such as 1-cyanoethyl-2-undecylimidazolium trimellitate, 2-methylimidazolium isocyanurate, 2-ethyl-4-methylimidazolium tetraphenylborate and 2-ethyl-1,4-dimethylimidazolium tetraphenylborate; amines, such as 2,4,6-tris(dimethylaminomethyl)phenol, benzyl dimethylamine, tetramethylbutyl guanidine, N-methyl piperazine and 2-dimethylamino-1-pyrroline; ammonium salts, such as triethylammonium tetraphenylborate; diazabicyclo compounds, such as 1,5-diazabicyclo(5,4,0)-7-undecene, 1,5-diazabicyclo(4,3,0)-5-nonene and 1,4-diazabicyclo(2,2,2)-octane; and tetraphenylborates, phenol salts, phenol novolak salts and 2-ethylhexanoates of those diazabicyclo compounds, and alcohols such as resorcinol. Of these compounds tertiary amines, phosphine compounds, imidazole compounds, diazabicyclo compounds and their salts are typically used. Dicyandiamide and boron trifluoride may also be used.

The cure rate modifier Component (C) can also be illustrated by compounds having an aliphatic unsaturated bond, organophosphorous compounds, organosulfur compounds, nitrogen-containing compounds, and tin compounds. Examples of the compounds having an aliphatic unsaturated bond include propargyl alcohol, ene-yne compounds, and maleic esters such as dimethyl maleate. Examples of the organophosphorus compounds are triorganophosphines, diorganophosphines, organophosphones, and triorganophosphites. The organosulfur compounds include organomercaptanes, diorganosulfides, hydrogen sulfide, benzothiazole, and benzothiazole disulfite. The nitrogen-containing compounds include ammonia, primary, secondary or tertiary alkylamines, arylamines, urea, and hydrazine. The amines are illustrated by triethylamine, tributylamine, N-methylmorpholine, N-ethylmorpholine, 1,4-diaza-bicylo-(2,2,2)-octane, N-cetyl dimethylamine, N-methyl-N'-dimethylaminoethyl-piperazine, N,N-dimethylbenzylamine, N,N-dimethylcyclohexylamine, and 1,2-dimethylimidazole. Organic tin compounds may also be used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or as a complex with amidines such as amino pyridines, amino pyrimidines, hydrazino pyridines, and tetrahydropyrimidines. Other metal-based compounds such as lead, iron, mercury, bismuth, cobalt and manganese also may be used, and include compounds such as cobalt(III) acetylacetonate, cobalt naphthoate, manganese naphthoate, lead oleate, zinc naphthenate and zirconium naphthenate. Other compounds such as silaamines and basic nitrogen compounds such as tetraalkylammonium hydroxide, alkali metal hydroxides such as sodium hydroxide, and alkali metal alcoholates such as sodium methylate may also be used.

When it is desirable to add the cure rate modifier (Component (C)) to the coating composition, it can be added in amounts from 0.001 to 5 parts by weight based on total weight of the coating formulation, alternatively from 0.1 to 2 parts by weight on the same basis.

The coating compositions of the present invention may further comprise other components that are conventionally employed in polymerizable systems. These components include, but are not limited to, solvents, plasticizers, pigments, colorants, dyes, surfactants, thickeners, heat stabilizers, leveling agents, anti-cratering agents, fillers, sedimentation inhibitors, ultraviolet-light absorbers, and the like. Additives such as promoters, heat stabilizers, ultraviolet-light absorbers, etc. may be intimately dispersed in the reaction mixture and apparently thereby become an integral part of the polymer. Preferred antioxidants are sterically hindered phenolic compounds. Stabilizers such as organic phosphites are also useful. Preferred UV inhibitors are benzotriazole compounds.

The coating compositions of this invention can further comprise at least one filler illustrated by hollow microspheres, fumed silica, precipitated silica, hydrous silicic acid, carbon black, ground quartz, calcium carbonate, magnesium carbonate, diatomaceous earth, wollastonite, calcined clay, clay, talc, kaolin, titanium oxide, bentonite, ferric oxide, zinc oxide, glass balloon, glass beads, mica, glass powder, glass balloons, coal dust, acrylic resin powder, phenolic resin powder, ceramic powder, zeolite, slate powder, organic fibers, and inorganic fibers.

The coating compositions of this invention can further comprise at least one cell stabilizer and at least one blowing agent, and optionally chain extenders and crosslinkers. The cell stabilizers are illustrated by silicones, alternatively silicone polyethers. The blowing agents are illustrated by water, liquid carbon dioxide, CFCs, HCFCs, HFCs, and pentane, alternatively, water or a mixture of water and HCFC. The addition of these ingredients to the compositions of this invention produce foam compositions having enhanced thermal stability.

The coating compositions of this invention may be prepared by mixing (or mechanically agitating) components (A) and (B), and any optional components, to form a homogenous mixture. This may be accomplished by any convenient mixing method known in the art exemplified by a spatula, mechanical stirrers, in-line mixing systems containing baffles and/or blades, powered in-line mixers, homogenizers, a drum roller, a three-roll mill, a sigma blade mixer, a bread dough mixer, and a two roll mill. The order of mixing is not considered critical. Once mixed, the coating composition is shelf stable and will not cure until exposed to heat. This heat may be generated using an oven in a batch or continuous mode, or by a heat gun or lamp, alternatively using an oven. Generally, the composition should be heated in order to effect curing, such as to a temperature greater than 100° C. for greater than 40 minutes, alternatively greater than 140° C. for greater than 15 minutes, alternatively greater than 180° C. for greater than 5 minutes. If needed, the composition could be heated up to 250° C.

The blocked isocyanate silicone resins of this invention are useful for making shelf stable curable one part coating compositions. Further, they can add thermal stability, weatherability, scratch resistance and reduce water absorption when formulated in urethane or urea coatings. They are particularly useful in protective coatings such as automotive topcoats, in electronics packaging, leather treatments and adhesives.

EXAMPLES

Test Methods:

60° GLOSS: (ASTM D523-89) Measured gloss ratings was obtained by comparing the specular reflectance from the sample to that from a black glass standard. Sixty-degree gloss is used for comparing most samples. Testing was performed using a Gloss-meter (BYK-Gardner Micro-Tri-gloss, Catalog #4522). A minimum of five readings were taken on the coating surface and the average was reported with higher values indicating smoother and more reflective coatings.

PENCIL HARDNESS: (ASTM D3363) Coatings were rated by attempting to scratch the surface with drafting pencils of increasing lead hardness. Coating hardness was rated as the highest lead hardness that cannot scratch through the coating.

GARDNER REVERSE IMPACT TEST: (ASTM D2794) 1.8 kg shaft with 1.3 cm rounded tip is dropped up to 35.6 cm onto the test panel, which is placed at the base. The test panel was extruded into a 1.6 cm diameter convex half sphere in the base. Coating failure occurred when crazing is detected. A value of zero indicates that coating failure occurred even at the lowest drop height, whereas a value of 30 indicated that failure did not occur when the maximum drop height was utilized.

Thermogravimetric Analysis

Thermogravimetric analysis was performed using a TA Instruments (New Castle, Del.) TGA 2950. Approximately 7 to 12 mg of a single piece of the test specimen was placed in a Pt pan and heated to 1000° C. at 10° C./min under a $N_2$ atmosphere and the weight loss continuously monitored and recorded. Similar tests were also performed up to 500° C. under an air and $N_2$ atmosphere. The weight loss at 500° C. in air and 500° C. and 1000° C. in $N_2$ was reported in Table 2. The uncertainty was estimated to be ±5% based on duplicate analysis.

Materials

For reference purposes

| | |
|---|---|
| $M^{PrOH}$ denotes | $(HO(CH_2)_3)(CH_3)_2SiO_{1/2}$ |
| M denotes | $(CH_3)_3SiO_{1/2}$ |
| $D^{NH2}$ denotes | $(CH_3)(CH_2CH_2CH_2NH_2)SiO_{2/2}$ |
| $D^{Ph}$ denotes | $(C_6H_5)(CH_3)SiO_{2/2}$ |
| $T^{Ph}$ denotes | $C_6H_5SiO_{3/2}$ |
| $T^{Me}$ denotes | $CH_3SiO_{3/2}$ |
| $D^{B1}$ | 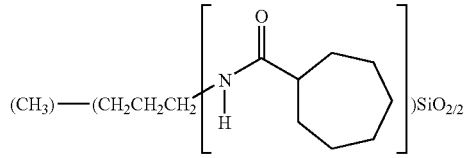 |

Preparation of Carbinol-Functional Silicone Resin A: $M^{PrOH}_{0.35}T^{Me}_{0.3}T^{Ph}_{0.3}$ 2379.5 g Phenyltrimethoxysilane and 1634.6 g methyltrimethoxysilane, were catalyzed by 2.3 g trifluoromethane sulfonic acid (TFMSA), and then were hydrolyzed with 500.9 g deionized water, followed by distillative removal of by-product methanol. 1316.4 g of 1,1,3,3-tetramethyl-1,3-disiloxane (TMDS), and 588.6 g acetic acid, were added, and the mixture was heated to 50° C. for three hours. Methanol and methyl acetate were removed via distillation. 1800 g of heptane was added, and the mixture was washed with (i) saturated aqueous sodium bicarbonate and (ii) multiple aliquots of deionized water. The mixture was then filtered, and the solvent was removed as needed by distillation yielding 3385 g of $M^H_{0.393}T^{Me}_{0.304}T^{Ph}_{0.303}$ SiH functional intermediate resin ($M^H$ denotes $H(CH_3)_2SiO_{1/2}$, $T^{Me}$ denotes $CH_3SiO_{3/2}$, and $T^{Ph}$ denotes $C_6H_5SiO_{3/2}$. Then, 249.9 g of this SiH functional silicone resin $M^H_{0.393}T^{Me}_{0.304}T^{Ph}_{0.303}$ was dissolved in 250 g xylene and heated to 70-95° C. A catalytic amount (1.8 g) of 1 percent by weight of $Pt(Al_2O_3)$ was added, followed by the addition of 196.5 g allyl alcohol. The mixture was heated at 70-110° C. until the SiH was consumed, as determined by following the disappearance of its peak in the FTIR spectrum at about 2165 $cm^{-1}$. Triphenylphosphine and carbon black were added as needed. The product mixture was filtered, and the solvent was removed to yield 301.9 g $M^{PrOH}_{0.35}T^{Me}_{0.3}T^{Ph}_{0.3}M^{PrOH}$ denotes $(HO(CH_2)_3)(CH_3)_2SiO_{1/2}$, $T^{Ph}$ denotes $C_6H_5SiO_{3/2}$, $T^{Me}$ denotes $CH_3SiO_{3/2}$, and the allyl alcohol is $CH_2=CHCH_2OH$. The equivalent weight of carbon bonded hydroxyl groups is 302.

Preparation of Amino Functional Silicone Resin B: $M_{0.10}D^{NH2}_{0.40}T^{Ph}_{0.49}$ A mixture of phenyltrimethoxysilane (198.4 g, 1.00 mol) and aminopropyldiethoxymethylsilane (153.4 g, 0.80 mol) in xylenes (164.9 g) were allowed to react with deionized water (36.1 g, 2.00 mol), followed by removal of 163.8 g of volatiles via distillation. Ethoxytrimethylsilane (71.0 g, 0.60 mol), additional xylenes (25 mL) and additional deionized water (52.3 g, 2.90 mol) were added. Aqueous phase was removed via azeotropic distillation. The reaction mixture was filtered and volatiles removed under vacuum on a rotary evaporator. A portion of the stripped product composition, $M_{0.10}D^{NH2}_{0.40}T^{Ph}_{0.49}$ was diluted to 76.3% in toluene. The equivalent weight of amine hydrogen groups in solution is 150.

Preparation of Amino Functional Silicone Resin C: $M_{0.03}D^{Ph}_{0.35}D^{NH2}_{0.62}$ A mixture of phenylmethyldimethoxysilane (159.5 g, 0.875 mol), hexamethyldisiloxane (10.66 g, 0.066 mol) and trifluoromethanesulfonic acid (0.15 g) were allowed to react with deionized water (4.55 g, 0.25 mol) at 60° C. for three hours. Aminopropyldiethoxymethylsilane (287.0 g, 1.50 mol) and additional deionized water (38.3 g, 2.13 mol) were added and volatiles (126.4 g) removed via distillation. Hi-Sol 10 (131.0 g) and additional deionized water (43.06 g, 2.38 mol) were added. Aqueous phase was removed via azeotropic distillation, followed by concentration via distillation to a 72.0% solution of $M_{0.03}D^{Ph}_{0.35}D^{NH2}_{0.62}$ in Hi-sol 10, which was then filtered. The equivalent weight of amine hydrogen groups in solution is 137

Preparation of Aminofunctional Silicone Resin D: $M_{0.184}D^{Ph}_{0.404}D^{NH2}_{0.158}T^{Ph}_{0.251}$ A mixture of phenyltrimethoxysilane (2067.1 g, 10.43 mol), methylphenyldimethoxysilane (3040.2 g, 16.70 mol) and trifluoromethanesulfonic acid (2.55 g) were allowed to react with deionized water (469.4 g, 26.06 mol) at reflux for fifteen minutes. Hexamethyldisiloxane (710.8 g, 8.75 mol)

was added and the mixture heated to 60° C. for three hours. Aminopropyldiethoxymethylsilane (1195.6 g, 6.25 mol) and additional deionized water (225.8 g, 12.51 mol) and volatiles (2328 g) removed via distillation. n-Heptane (1265.5 g) and additional deionized water (694.8 g, 38.56 mol) were added and the aqueous phase removed via azeotropic distillation. The reaction mixture was filtered and volatiles removed under vacuum on a rotary evaporator. The solventless resin had an amine hydrogen equivalent weight of 387.

Polyol 1: Desmophen® A870 BA is a hydroxyl-functional polyacrylate resin supplied in butyl acetate (70% solids) by Bayer Corporation (Pittsburgh, Pa.) having an equivalent weight of 576 g/mol carbon bonded hydroxyl.

Blocked Isocyanate 1: Tolonate® D2 Methylethyl ketoxime blocked hexamethylene diisocyanate (Equivalent weight 370 g/mol blocked isocyanate (75% solids in aromatic solvent) (Rhodia, Cranbury, N.J.)

Control: Using Blocked Isocyanate 1, as depicted in Table 1, a one-part urethane formulation was prepared by blending the blocked isocyanate at a 10% excess (relative to stoichiometry, a molar ratio of blocked isocyanate to carbon bonded hydroxy of 1.1:1) with Polyol 1, as depicted in Table 1 to make a urethane coating.

Example 1

Preparation of Blocked Isocyanate Silicone Resin E

An aliquot of amino functional silicone resin B (132.0 g, 0.336 mol $NH_2$) was further diluted in toluene (154.3 g) and allowed to react with carbonylbiscaprolactam (84.8 g, 0.336 mol) manufactured by (Allinco, Geleen, Netherlands) at 100° C. for one hour. The reaction mixture was washed with 4% aqueous calcium chloride, dried over anhydrous calcium chloride, filtered and concentrated to a 66.2% solution under vacuum on a rotary evaporator with a resulting solution blocked isocyanate equivalent weight of 776.

Example 2

Preparation of Blocked Isocyanate Silicone Resin F

An aliquot of amino functional silicone resin C (92.22 g, 0.334 mol NH2) was further diluted in Hi-Sol 10 (125.0 g) and allowed to react with carbonylbiscaprolactam (84.45 g, 0.335 mol) at 100° C. for one hour. The reaction mixture was washed with 4% aqueous calcium chloride, dried over anhydrous magnesium sulfate, filtered, concentrated under vacuum on a rotary evaporator and diluted to a 65.7% solution using toluene with a resulting solution blocked isocyanate equivalent weight of 512.

Examples 3-5

Preparation of One-Part Urethane Formulations

Using blocked isocyanate siloxane resins E and F prepared in Examples 1 and 2, respectively, as depicted in Table 1, one-part urethane formulations were prepared by blending the blocked isocyanate at a 10% excess (relative to stoichiometry) with a carbinol functional silicone resin A or organic polyol as depicted in Table 1 to make urethane coatings.

Example 6

Preparation of One-Part Urea Formulation

Using blocked isocyanate siloxane resin E, a one-part urea formulation was prepared by blending the blocked isocyanate at a 10% excess (relative to stoichiometry) with amino functional silicone resin D as depicted in Table 1.

For the Control and Examples 3-6, each one-part formulation was evaluated in three different configurations 1) 0.003 in draw down coating on an aluminum panel and cured, 2) poured as 3 mm thick layer in an aluminum pan mold and cured into a monolith and evaluated for appearance and high temperature weight loss in air and $N_2$ environments 3) poured into a capped vial and evaluated over time for viscosity changes to check 1-part storage viability. The appearance and tactile observations of the formulations and cured materials are shown in Table 1. Table 2 displays the coating properties and the monolith thermal stability properties of the cured materials.

TABLE 1

One-Part Urethane and Urea Formulations and Performance Observations

Weight in grams added to Formulation
(molar ratio blocked isocyanate to carbon bonded hydroxyl or amino))

| | Isocyanate | | | Carbinol/Polyol | | Amino | Formulation and Cured Material Observations | | | |
|---|---|---|---|---|---|---|---|---|---|---|
| Example | Blocked Isocyanate E | Blocked Isocyanate F | Blocked Isocyanate 1 | Silicone Resin A | Polyol 1 | Silicone Resin D | Solution Appearance | Coating Cured* | Monolith Cure+ | Shelf Stable# |
| Control | | | 3 (1.1) | | 4.2 | | Clear colorless | Cured, smooth | Cured, tan, brittle | Yes |
| 3 | 3 (1.1) | | | | 3.0 | | Clear slight yellow | Cured, Fish Eyes | Cured, slight. yellow, tough | Yes |
| 4 | 3 (1.1) | | | 1.60 | | | Clear slight yellow | Cured, smooth | Cured, tan, tacky rubbery | Yes |
| 5 | | 3 (1.1) | | 1.17 | | | Clear slight tan | Cured, Smooth | Cured, clear, brittle | Yes |
| 6 | 3 (1.1) | | | | | 2.04 | Clear slight tan | Cured, smooth | Cured, slight. tan, rubbery | Yes |

*cured 2 hr at 150 C in air
+cured 1 hr 70 C., 1 hr 100 C. and 1 hr 150 C. in air.
yes (no visible sign of viscosity drift in sealed vial for >2 months)

TABLE 2

Coating Properties and Thermal Stability

| | Coating Properties | | | Thermal Stability | | |
|---|---|---|---|---|---|---|
| Example | P Hardness | Gloss | Impact in lbs | 500 C. Wt Retention % Air | 500 C. Wt Retention % N2 | 1000 C. Wt Retention % N2 |
| Control | 4H | 101 | 10 | 8 | 1 | 1 |
| 3 | 4H | 98 | 10 | 24 | 11 | 8 |
| 4 | 2H | 96 | 10 | 56 | 52 | 42 |
| 5 | H | 94 | 6 | 65 | 62 | 52 |
| 6 | 2B | 100 | 18 | 59 | 43 | 32 |

The one part urethanes and urea utilizing a blocked isocyanate silicone resin described in Examples 3 to 6 have comparable coating properties to the Control and improved thermal stability over the Control.

The invention claimed is:

1. A curable coating composition comprising (A) a blocked isocyanate silicone resin having an average formula (I) $R^1_a(R^2O)_b SiO_{(4-(a+b)/2)}$, where each $R^1$ is monovalent and independently selected from an alkyl group, an aryl group, and a blocked isocyanate group having a general formula (II) —NHC(O)Z, where Z is a blocking agent such that at elevated temperatures it will dissociate and produce the corresponding isocyanate, which $R^1$ groups may be the same or different, $R^2$ is hydrogen or a monovalent C1 to C4 alkyl group, a is from 0.7 to 2.0, b is from 0 to 0.5, and (a+b) is 0.7 to 2.3, with the proviso that on average there is at least one blocked isocyanate group per silicone resin molecule, and wherein the blocked isocyanate has an equivalent weight of 150 to 1500; and (B) a functional silicone material, a functional organic material or a mixture thereof having in each case on average at least 2 carbon-bonded hydroxyl groups or aminofunctional hydrocarbon groups where the functional organic material is chosen from an organic polyol and an organic amine and the functional silicone material has an average formula $R^6_n(R^2O)_m SiO_{(4-(n+m)/2)}$ where each $R^6$ is monovalent and independently selected from a hydrogen atom, an alkyl group, an aryl group, a carbinol group free of aryl groups having at least 3 carbon atoms, an aryl-containing carbinol group having at least 6 carbon atoms, or an aminofunctional hydrocarbon group, which $R^6$ groups may be the same or different, $R^2$ is hydrogen or a monovalent C1 to C4 alkyl group, n is from 0.7 to 2.2, m is from 0 to 0.5, and m+n is 0.7 to 2.3, where the total mole ratio of blocked isocyanate groups to carbon-bonded hydroxyl+amino groups is 0.9:1 to 1.3:1, with the proviso when the functional silicone material is used there is on average at least 1 carbinol group or aminofunctional hydrocarbon group per molecule.

2. The curable coating composition of claim 1, wherein n is from 1.0 to 2, m is from 0 to 0.2, and subscripts m+n is 1 to 2.

3. The curable coating composition of claim 1, wherein the total mole ratio of blocked isocyanate groups to carbon-bonded hydroxyl+amino groups is 1.0:1 to 1.2:1.

4. A method of making a curable coating composition comprising (1) forming a mixture comprising
(A) a blocked isocyanate silicone resin having an average formula (I) $R^1_a(R^2O)_b SiO_{(4-(a+b)/2)}$, where each $R^1$ is monovalent and independently selected from an alkyl group, an aryl group, and a blocked isocyanate group having a general formula (II) —NHC(O)Z, where Z is a blocking agent such that at elevated temperatures it will dissociate and produce the corresponding isocyanate, which $R^1$ groups may be the same or different, $R^2$ is hydrogen or a monovalent C1 to C4 alkyl group, a is from 0.7 to 2.0, b is from 0 to 0.5, and (a+b) is 0.7 to 2.3, with the proviso that on average there is at least one blocked isocyanate group per silicone resin molecule, and wherein the blocked isocyanate has an equivalent weight of 150 to 1500; and (B) a functional silicone material, a functional organic material or a mixture thereof having in each case on average at least 2 carbon-bonded hydroxyl groups or aminofunctional hydrocarbon groups where the functional organic material is chosen from an organic polyol and an organic amine and the functional silicone material has an average formula $R^6_n(R^2O)_m SiO_{(4-(n+m)/2)}$ where each $R^6$ is monovalent and independently selected from a hydrogen atom, an alkyl group, an aryl group, a carbinol group free of aryl groups having at least 3 carbon atoms, an aryl-containing carbinol group having at least 6 carbon atoms, or an aminofunctional hydrocarbon group, which $R^6$ groups may be the same or different, $R^2$ is hydrogen or a monovalent C1 to C4 alkyl group, n is from 0.7 to 2.2, m is from 0 to 0.5, and m+n is 0.7 to 2.3, where the total mole ratio of blocked isocyanate groups to carbon-bonded hydroxyl+amino groups is 0.9:1 to 1.3:1, with the proviso when the functional silicone material is used there is on average at least 1 carbinol group or aminofunctional hydrocarbon group per molecule.

5. The method of making a curable coating composition claim 4, wherein n is from 1.0 to 2, m is from 0 to 0.2, and subscripts m+n is 1 to 2.

6. The method of making a curable coating composition of claim 4, wherein the total mole ratio of blocked isocyanate groups to carbon-bonded hydroxyl+amino groups is 1.0:1 to 1.2:1.

7. A method of making cured coating composition comprising (1) forming a mixture comprising
(A) a blocked isocyanate silicone resin having an average formula (I) $R^1_a(R^2O)_b SiO_{(4-(a+b)/2)}$, where each $R^1$ is monovalent and independently selected from an alkyl group, an aryl group, and a blocked isocyanate group having a general formula (II) —NHC(O)Z, where Z is a blocking agent such that at elevated temperatures it will dissociate and produce the corresponding isocyanate, which $R^1$ groups may be the same or different, $R^2$ is hydrogen or a monovalent C1 to C4 alkyl group, a is from 0.7 to 2.0, b is from 0 to 0.5, and (a+b) is 0.7 to 2.3, with the proviso that on average there is at least one blocked isocyanate group per silicone resin molecule, and wherein the blocked isocyanate has an equivalent weight of 150 to 1500; and (B) a functional silicone material, a functional organic material or a mixture thereof having in each case on average at least 2 carbon-bonded hydroxyl groups or aminofunctional hydrocarbon groups where the functional organic material is chosen from an organic polyol and an organic amine and the functional silicone material has an average formula $R^6_n(R^2O)_m SiO_{(4-(n+m)/2)}$ where each $R^6$ is monovalent and independently selected from a hydrogen atom, an alkyl group, an aryl group, a carbinol group free of aryl groups having at least 3 carbon atoms, an aryl-containing carbinol group having at least 6 carbon atoms, or an aminofunctional hydrocarbon group, which $R^6$ groups may be the same or different, $R^2$ is hydrogen or a monovalent C1 to C4 alkyl group, n is from 0.7 to 2.2, m is from 0 to 0.5, and m+n is 0.7 to 2.3, where the total mole ratio of blocked isocyanate groups to carbon-bonded hydroxyl+amino groups is 0.9:1 to 1.3:1, with the proviso when the functional silicone material is used there is on average at least 1 carbinol group or aminofunctional hydrocarbon group per molecule, (2) Heating the mixture so that the blocked isocyanate dissociates to the corresponding isocyanate which enables the curing reactions to proceed.

8. The method of making a cured coating composition of claim 7, wherein n is from 1.0 to 2, m is from 0 to 0.2, and subscripts m+n is 1 to 2.

9. The method of making a cured coating composition of claim 7, wherein the total mole ratio of blocked isocyanate groups to carbon-bonded hydroxyl+amino groups is 1.0:1 to 1.2:1.

10. A cured coating composition prepared by the method of claims 7.

* * * * *